United States Patent [19]
Kirk et al.

[11] 4,136,023
[45] Jan. 23, 1979

[54] METHODS AND APPARATUS FOR TREATING WASTEWATER

[75] Inventors: Bradley S. Kirk, Plainfield; Raymond M. Chappel, Mendham, both of N.J.

[73] Assignee: Airco, Inc., Montvale, N.J.

[21] Appl. No.: 594,408

[22] Filed: Jul. 8, 1975

Related U.S. Application Data

[63] Continuation of Ser. No. 413,409, Nov. 6, 1973, abandoned.

[51] Int. Cl.² .................... C02C 1/08; C02C 5/04; C02B 3/08
[52] U.S. Cl. .................................. 210/7; 210/14; 210/15; 210/60; 210/63 R; 210/194; 210/218; 210/219; 210/220
[58] Field of Search .................... 55/192; 209/170; 210/4-8, 14, 15, 63, 170, 195 M, 197, 199, 218, 220, 221 R, 242 A, 320, 60, 194; 261/91, 119 R, DIG. 75

[56] References Cited

U.S. PATENT DOCUMENTS

| | | | |
|---|---|---|---|
| 1,732,893 | 10/1929 | Hunt | 209/170 |
| 2,638,444 | 5/1953 | Kappe | 210/14 X |
| 3,133,017 | 5/1964 | Lambeth | 210/5 |
| 3,220,706 | 11/1965 | Valdespino | 210/14 X |
| 3,503,593 | 3/1970 | Nelson | 261/91 X |
| 3,547,811 | 12/1970 | McWhirter | 210/7 |
| 3,643,403 | 2/1972 | Speece | 261/91 X |
| 3,713,274 | 1/1973 | Sauer et al. | 55/192 X |
| 3,725,258 | 4/1973 | Spector et al. | 210/7 |
| 3,775,307 | 11/1973 | McWhirter et al. | 210/14 |
| 3,794,303 | 2/1974 | Hirshon | 261/91 X |
| 3,823,828 | 7/1974 | Derzhavets et al. | 210/242 |

FOREIGN PATENT DOCUMENTS 95365  7/1922  Switzerland ............... 261/DIG. 75

Primary Examiner—Robert H. Spitzer
Attorney, Agent, or Firm—David L. Rae; Larry R. Cassett; Edmund W. Bopp

[57] ABSTRACT

This invention provides improved methods and apparatus for dissolving oxygen in wastewater treatment processes such as is required to satisfy the biological oxygen demand in the activated sludge process for the biodegradation of organic impurities. The invention enables attainment of high concentrations of dissolved oxygen with minimum consumption of oxygen and power. Wastewater with the high concentration of dissolved oxygen may be mixed with a larger volume of untreated wastewater to achieve the desired oxygen concentration and maintain volatile solids in suspension in the bulk liquid for optimum efficiency of purification.

16 Claims, 9 Drawing Figures

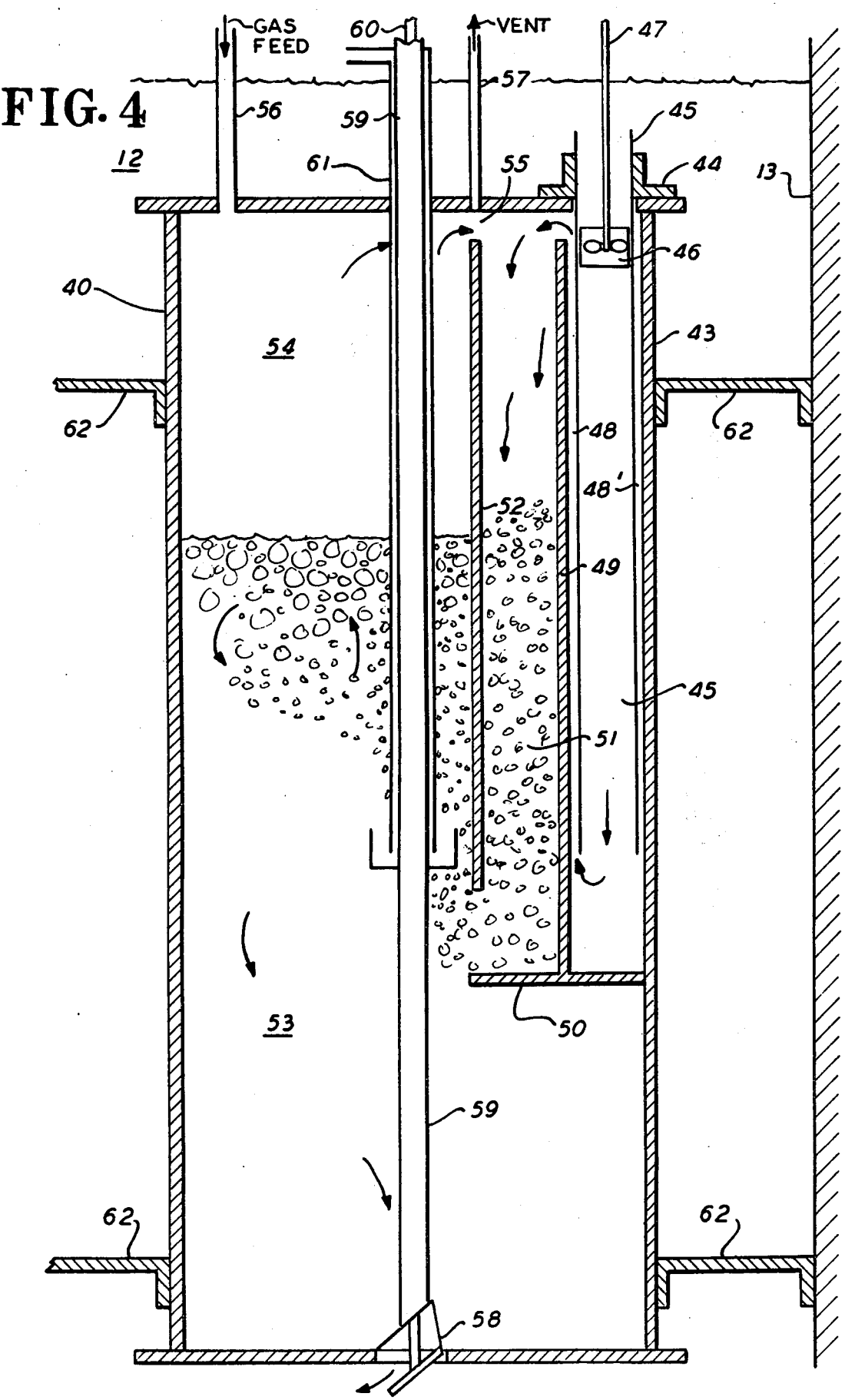

METHODS AND APPARATUS FOR TREATING WASTEWATER

This is a continuation of application Ser. No. 413,409, filed Nov. 6, 1973, now abandoned.

BACKGROUND

This invention relates generally to water treatment technology and more specifically to methods and apparatus for dissolving oxygen in wastewater such as water received for purification in municipal sewage plants and the like.

The conventional activated sludge process for the treatment of wastewater involves the biological degradation of organic materials contained therein. This requires the maintenance of aerobic conditions, normally achieved by relying on open aeration to dissolve oxygen from ambient air into wastewater. While such processes have been used successfully for many years there are definite limits on the speed and efficiency of such processes. For example both the rate at which oxygen can be dissolved in the water and the maximum oxygen concentration that can be achieved are clearly limited. As a result the ever expanding needs for more and better wastewater treatment to protect the ecology in our expanding society can be met, using existing processes, only by a proliferation of plants for such processes at great capital expense and with the utilization of vast quantities of power in their operation.

The present invention is directed to methods and apparatus for more quickly and efficiently dissolving oxygen in wastewater to accelerate the biodegradation of organic material. This, in turn, increases the throughput of any given treatment facility and reduces the unit cost of wastewater treatment.

Cost reduction can be effected even though oxygen or oxygen enriched air (which costs money) is utilized in place of air (which is "free"). However, to keep the treatment cost to a minimum, the oxygen must be used efficiently, i.e., a high percentage of the oxygen supplied must be dissolved in and retained by the wastewater.

OBJECTS

It is an object of the present invention to provide improved methods and apparatus for the dissolution of oxygen in wastewater.

Another object of the present invention is to provide methods and apparatus for the dissolution of oxygen in wastewater at a faster rate than heretofore.

Another object of the present invention is to provide methods and apparatus for the dissolution of oxygen in wastewater with a minimum consumption of power.

Another object of the present invention is to provide methods and apparatus that will enable higher concentrations of dissolved oxygen than heretofore.

Another object of the invention is to provide a self-contained unit or module that can be used directly in or adjacent an existing tank or pond to dissolve oxygen in all of the water in the said tank or pond without requiring significant structural modifications, such as covers or the like, to the tank or pond.

It is a further object of the present invention to provide methods and apparatus for dissolving oxygen in wastewater wherein an efficient utilization of supplied oxygen is enabled.

Yet another object of the present invention is to provide methods and apparatus correctly stirring wastewater in a treatment tank at sufficient velocities to prevent settling of suspended solids.

SUMMARY

In accordance with the present invention a structure is provided that includes an enclosed chamber having an inlet, an outlet and an oxygenating zone therebetween. The structure may be positioned in the tank or other body of water to be oxygenated or it may be adjacent thereto. Water to be oxygenated is drawn from a main body of such water into the device through the inlet and after oxygenation it is discharged from the outlet into the same main body from which it was withdrawn, or alternatively into a second main body for mixing with and dilution of the water contained therein.

Oxygenation takes place within the unit by causing the stream of water entering the unit to pass into a pocket of oxygen rich gas maintained within the unit and impinge on the surface of the water adjacent the trapped pocket of gas in a confined turbulent zone. Parameters are established to assure adequate residence time for the stream in the turbulent zone, after which the stream enters a more quiescent zone which allows undissolved oxygen to escape from the water and return to the gas pocket for reuse. The water containing a high level of dissolved oxygen is thereafter directionally discharged at a predetermined velocity from the unit to cause the discharged water to mix thoroughly with the main body of wastewater in the tank or pond which is usually the tank or pond from which it had been withdrawn. In the preferred embodiment the water entering the unit is pumped through a trap-like channel over a weir to cause a free fall through the confined volume of oxygen rich gas maintained at suitable pressure within the unit. After impingement on the surface of the water at the foot of the fall the turbulent stream may be channeled by appropriate baffles away from the fall zone to the more quiescent zone for separation and recovery of undissolved oxygen.

PRIOR ART

It was known prior to the present invention to accelerate the activated sludge wastewater treatment process by substituting an oxygen enriched atmosphere for ambient air as the medium for sustaining aerobic conditions in an aeration basin. Such a process is described in the article "Aeration With A High-Oxygen Atmosphere In A.S. Process", by Harold E. Babbitt, and was published in Wastes Engineering, May 1952, pp. 258-259. The Babbitt article describes a process for oxygenating wastewater wherein a gas-tight cover is provided across the top of an aeration tank with an oxygen-enriched atmosphere being maintained in the head space between the surface of the wastewater and the tank cover. A feed gas comprised of 95% oxygen is introduced into the aeration tank by means of a submerged aerating device and the aeration gas collected in the head space is recirculated through a compressor to the aerating device. Although the aforedescribed process has resulted in relatively high levels of dissolved oxygen within acceptable time periods, the accumulation of large amounts of an oxygen enriched aeration gas in the head space of the aeration tank represents a serious safety hazard.

More recently, similar waste treatment processes utilizing oxygen enriched atmospheres in the head space of a covered aeration tank and mechanical agitators for dynamically mixing oxygen and wastewater have been devised in an effort to more efficiently utilize the oxygen. For example, systems similar to the apparatus and methods described in the Babbitt article are also described in five U.S. Pat. Nos. 3,547,811 through 3,547,815. Again, systems illustrated in the foregoing references require the maintenance of an oxygen enriched atmosphere in a large head space of covered tanks and, therefore, provide an abundant supply of combustion supporting material. Furthermore, by employing mechanical agitators in the form of shaft-driven impellers, surface aerators and the like, the possibility of inadvertently producing a spark which could trigger a fire or explosion in such an oxygen enriched atmosphere is substantially increased.

In addition to preventing a possible safety hazard the foregoing attempts to upgrade the activated sludge process in an existing facility required substantial structural modification of such a facility with attendant down time and capital expense.

In U.S. Pat. No. 3,503,593, the use of surface aerators in a submerged chamber for dissolving a gas such as air in a liquid is described. An air space is formed in the chamber by introduction of air under pressure. Although such a device avoids the foregoing safety hazards associated with utilization of surface aerators in an oxygen enriched atmosphere, a relatively high expenditure of mechanical power is required to dissolve oxygen in the introduced air into a liquid such as wastewater. Other apparatus for dissolving a gas in a liquid by prolonging gas bubble-liquid contact time are described in U.S. Pat. Nos. 3,476,366 and 3,643,403. This technique relies upon the introduction of gas bubbles into a downward-flowing liquid in a submerged funnel. Upwardly acting buoyant forces and downwardly acting drag forces tend to increase the contact time between gas bubbles and the liquid. Such techniques, however, generally fail to adequately mix the liquid discharged from such a funnel with a surrounding larger body of the liquid as is required in an activated sludge process. Furthermore, such dissolution processes place heavy reliance on mere gas-liquid contact to effect a mass transfer which transfer does not necessarily occur in an efficient manner in practical applications.

BRIEF DESCRIPTION OF THE DRAWINGS

The invention will be more clearly understood by reference to the following detailed description of an exemplary embodiment thereof in conjunction with the following drawings in which:

FIG. 4 is an elevational sectional view of a further exemplary embodiment of an oxygenating apparatus in accordance with the present invention;

DESCRIPTION OF PREFERRED EMBODIMENTS

Figure 1:
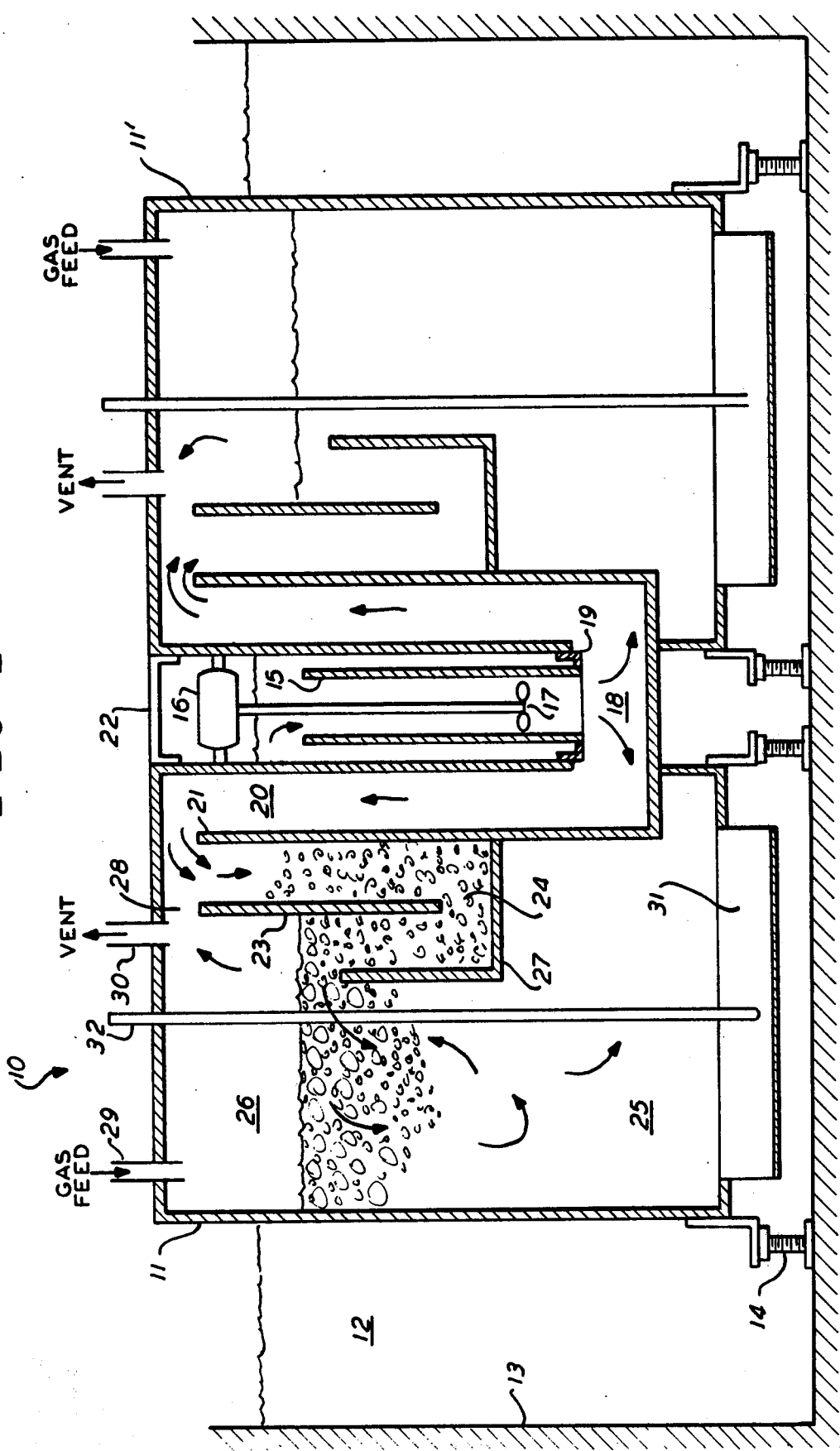
FIG. 1 is a sectional elevational view of an exemplary oxygenating apparatus.

Referring now to the drawing, and in particular to FIG. 1, illustrated therein is an exemplary embodiment of an apparatus for oxygenating wastewater which may be utilized in an activated sludge waste treatment process. In this process, untreated wastewater is commonly admitted to a primary settling basin wherein readily settlable solids are permitted to settle and are collected on the bottom of such a basin. Wastewater is then passed to a treatment tank along with activated sludge and an oxygen supplied in a feed gas is dissolved therein. At this stage of the process, the combined wastewater and activated sludge is many times referred to as a "mixed liquor" although for purposes of convenience, the term wastewater will be used as a full equivalent. After retaining wastewater for a sufficient time to permit reduction in the biological oxygen demand of the wastewater to a desired level, the wastewater is passed to a clarifier wherein purified effluent is decanted and activated sludge is settled out. In order to maintain a sufficient level of microbial activity, a predetermined portion of the collected sludge is returned to the treatment tank.

The oxygenating apparatus 10 is comprised of a pair of substantially identical generally enclosed chambers 11 and 11' which are emplaced in a body of wastewater 12. A tank 13, which may comprise a conventional open, secondary treatment tank for receiving wastewater to be oxygenated, is provided to confine wastewater 12 therein.

Chamber 11 is positioned within tank 13 and by way of suitable bracket members is mounted on adjustable legs 14. The upper extremities of chamber 11 extend above the surface of wastewater 12 although chamber 11 may be totally submerged in a particular tank. The bottom of chamber 11 is sufficiently spaced from the bottom of tank 13 to permit predetermined flows of oxygenated wastewater to be established in tank 13. Oxygenating apparatus 10 is provided with an inlet 15 in the form of a conventional pipe which is positioned below the surface of wastewater 12 and between chambers 11 and 11'. A pump 17 which may comprise a conventional axial flow impeller pump is disposed within inlet 15 and is mounted for rotation on a shaft in known manner. An electrical motor 16 mounted above wastewater 12 is drivingly coupled through the shaft to pump 17. In this manner a flow of wastewater 12 is forced through plenum 18 into chambers 11 and 11'. Plenum 18 may take the form of a bilateral fluid flow divider which is provided with bracket members 19 for rigidly connecting the lower portions of chambers 11 and 11'. Additionally, the upper portions of chambers 11 and 11' may be affixed to one another by suitable bracket members 22. Alternately, chambers 11 and 11' may be positioned externally of tank 13 and adapted to receive wastewater from and discharge oxygenated wastewater into tank 13.

Chamber 11, which is generally enclosed, is comprised of inlet 20, static mixing zone 24, liquid and gas accumulation spaces 25 and 26, respectively, and an outlet 31. Inlet 20 of chamber 11 is a substantially vertical channel defined by an external vertical wall of chamber 11 and partition 21. A vertical baffle 23 is suitably mounted in chamber 11 spaced away from and parallel to a portion of partition 21. The top of baffle 23 is spaced away from the ceiling of chamber 11 and the lower extremity of baffle 23 is spaced away from a substantially horizontal portion of baffle 27 extending from partition 21. Accordingly, partition 21 and baffle 23 are effective to define a static mixing zone 24 as will be described in greater detail hereafter.

A gas accumulation space 26 is formed in the upper reaches of chamber 11 by the introduction therein of an oxygen containing feed gas under an appropriate pressure. The extent of gas accumulation space 26 and, therefore, the depth of liquid in space 25, is determined by the pressure of the gas fed through inlet 29 to the upper reaches of chamber 11. It will be appreciated that the gas present in space 26 during operation of apparatus 10 is comprised of the feed gas, oxygen disentrained from wastewater in liquid accumulation space 25 and other gases stripped from the wastewater. Accordingly, the gas within gas space 26 is hereafter referred to as the "oxygenating gas". Communication between gas accumulation space 26 and the static mixing zone 24 is provided through passage 28 which passage is defined by the top of chamber 11 and the uppermost extremity of baffle 23. The feed gas introduced into the upper reaches of chamber 11 is preferably comprised of an oxygen enriched gas containing at least 40% oxygen. A vent, or outlet, 30 is provided to permit the removal of spent or waste gases such as nitrogen which is stripped from wastewater during the oxygenation thereof and is collected in gas accumulation space 26. Preferably, vent 30 is located away from gas accumulation space 26 in order to prevent any foam, which may develop therein in the course of oxygenating wastewater, from entering the vent line.

A discharge outlet for oxygenated wastewater is provided in the lower reaches of chambers 11 and 11'. The particular configuration of such an outlet will be determined by the particular flow pattern to be maintained in wastewater 12 to maintain activated solids (suspended solids) in suspension and to mix oxygenated wastewater with wastewater 12. As required flow patterns of wastewater 12 are additionally affected by the particular geometry of tank 13, it will be appreciated that either flap 31 or nozzle 33 (FIG. 2), or a combination of both, may be utilized to produce such flow patterns. An adjustable flap 31 which is hinged about, and preferably extends across, the bottom of chamber 11 is provided. A similar flap is provided in like manner with chamber 11'. A control rod 32 is suitably connected at the lower extremity thereof to flap 31 and extends upwardly through and is sealed to the top of chamber 11. Externally effected adjustments of the opening of flap 31, and hence, the velocity of oxygenated wastewater discharged from chamber 11, are achieved by manually raising or lowering control rod 32.

Figure 2:
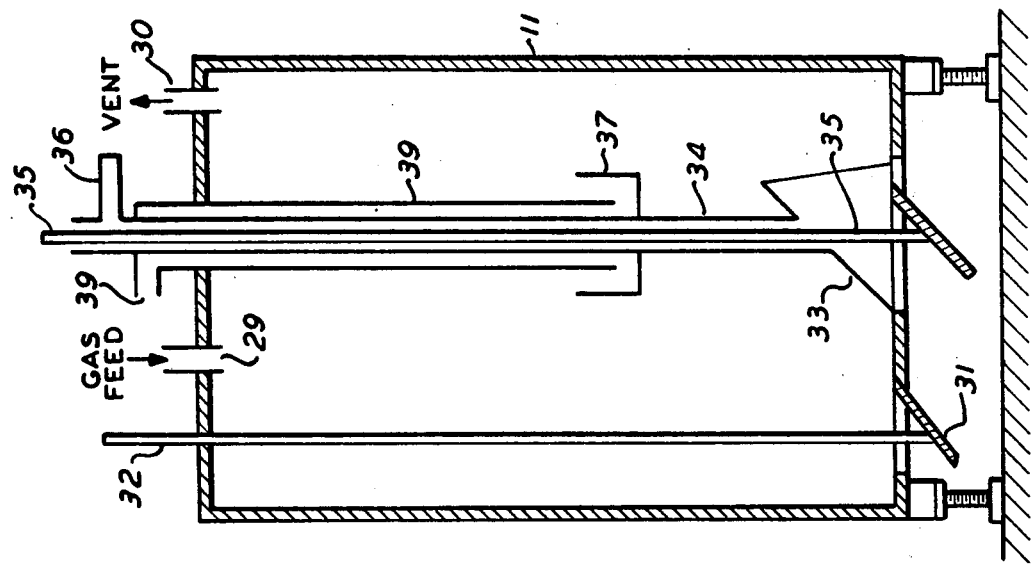
FIG. 2 is a side sectional view of the exemplary oxygenating apparatus illustrated in FIG. 1.

A nozzle 33 and a mechanical control arrangement therefor are provided with chamber 11 and for purposes of clarity, this structure is illustrated in FIG. 2. The nozzle 33, which may generally comprise a spout is configured to extend over a substantially shorter portion of the bottom of chamber 11 than does flap 31. Accordingly, the oxygenated wastewater discharged from chamber 11 through nozzle 33 will exhibit a greater velocity and smaller cross-section area than the oxygenated wastewater discharged through flap 31. As will be described in greater detail hereafter, the directionality and opening of nozzle 33 may be controlled to establish predetermined flow patterns in wastewater 12.

Referring now to FIG. 2, an exemplary mechanical arrangement for enabling externally effected adjustments to be made to flap 31 and nozzle 33 is illustrated. It is realized that although the foregoing mechanical arrangement is depicted in conjunction with chamber 11, a substantially identical arrangement (not shown) is provided to control a similar flap and nozzle outlet configuration of chamber 11'.

The control arrangement for nozzle 33 is specifically adapted to facilitate nozzle opening and direction control by an operator from a point external to chamber 11 above wastewater 12. Although a detailed description of nozzle 33 is set forth hereafter in connection with the nozzle illustrated in FIG. 5, other suitable nozzle configurations may be utilized. The control arrangement for nozzle 33 comprises a torque tube 34 having a handle 36 affixed thereto and a control rod 35. The directionality of nozzle 33 is controlled by rotating handle 36 and consequently torque tube 34 in a horizontal plane while the opening of nozzle 33 is controlled by merely raising and lowering rod 35 which in turn closes and opens a discharge spout of nozzle 33 as will be described in greater detail hereafter.

A pressure relief device is provided as a precautionary measure in chamber 11 and is comprised of a tubular cup 37 and conduit 39 having an outlet at the upper end thereof. Tubular cup 37 and conduit 39 are disposed about torque tube 34 at a predetermined level in liquid accumulation space 25 and form a liquid seal which under normal conditions inhibits the escape of any gas from the outlet of conduit 39. However, in the event that the pressure of an oxygenating gas supplied to the upper reaches of chamber 11 is sufficient to depress the level of water in liquid accumulation space 25 below the lower extremity of conduit 39, the aforedescribed water seal is broken thereby venting such gas and imposing an upper limit to the pressure of a supplied oxygenating gas by venting such gas to the atmosphere. In addition, the water seal acts as a bubble baffle to prevent bubbles of oxygenating gas from escaping upwardly through tube 39.

Figure 3:
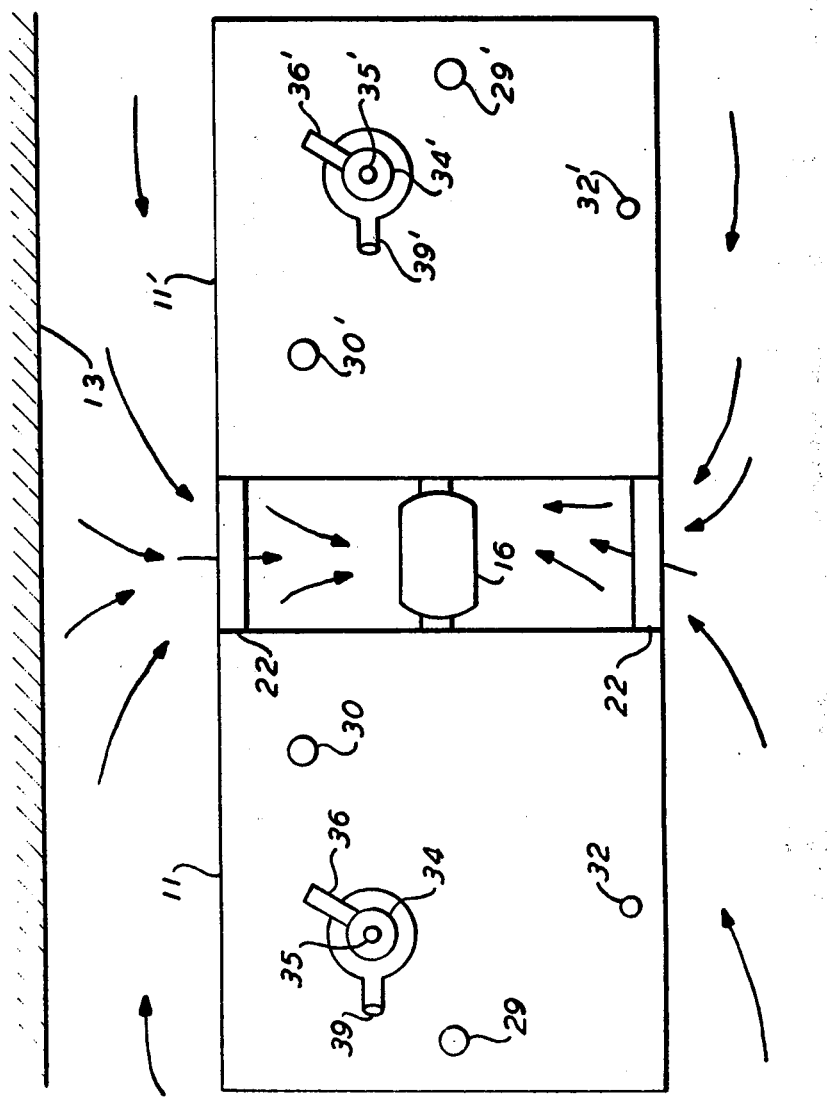
FIG. 3 is a plan view of the exemplary oxygenating apparatus illustrated in FIG. 1.

A plan view of chambers 11 and 11' is shown in FIG. 3. In addition, the flow of wastewater 12, particularly at the surface thereof, is schematically illustrated by arrows. It will be realized that as motor 16 drives pump 17 (FIG. 1) wastewater 12 is subjected to a suction force and is drawn into the space between chambers 11 and 11' prior to the actual pumping of wastewater into such chambers as previously mentioned.

Prior to describing the operation of the oxygenating apparatus 10, illustrated in FIG. 1, it is important that several requisites of wastewater treatment to be satisfied by such an apparatus are clearly understood and appreciated. A first requirement for effective operation is to maximize the amount of oxygen dissolved in wastewater in relation to the energy required to effect such dissolution. A second requirement is to dissolve in wastewater as much of the supplied oxygen as possible and accordingly, to vent a minimum amount of oxygen from the apparatus. Thus, the greater the percent of oxygen consumption by an oxygenating apparatus, the more efficient is such an apparatus in terms of oxygen utilization and hence, in terms of the cost of oxygen supplied thereto. A third requirement is particularly important with respect to the oxygenating apparatus utilized in connection with activated sludge waste treatment processes wherein in order to permit the consumption of organic waste material by bacterial action, the bacterial sludge must be maintained in suspension in the wastewater. Accordingly, the wastewater in an aeration tank must be stirred effectively notwithstanding the fact that such stirring has previously resulted in increased "mixing" energy consumed in terms of the amount of oxygen dissolved in the wastewater. In the course of describing the operation of oxygenating apparatus 10 hereafter, the ability of the present invention to satisfy the foregoing requirements will become readily apparent.

The operation of the oxygenating apparatus as illustrated in FIG. 1 is as follows. Wastewater 12 in tank 13 is introduced into an inlet conduit 15 and is pumped by way of pump 17 into plenum 18. Hydraulic kinetic energy is thus imparted to wastewater 12 which is divided into two approximately equal flow streams in plenum 18 and is then pumped under pressure upwardly through inlet channel 20 of chamber 11 and flows over the top edge of partition 21. It is noted that by virtue of forcing a flow of wastewater upwardly through inlet channel 20, a water seal is maintained between a gas accumulation space in 26 in chamber 11 and hydraulic pump 17.

Simultaneous with the introduction of wastewater 12 into chamber 11, an oxygen-containing feed gas is introduced under pressure through inlet 29 into the upper reaches of chamber 11 thereby depressing the level of wastewater within liquid accumulation space 25 to a point corresponding to the magnitude of the pressure of the oxygenating gas.

As previously mentioned, static mixing zone 24 is defined by partition 21 and baffles 23 and 27 with the particular type of static mixing zone illustrated herein being of the gravitational fall type. It is realized that other forms of static mixing devices, such as an eductor may be utilized in lieu of a gravitational fall zone. Wastewater is caused to flow over the top of partition 21 and then falls under the influence of gravity into zone 24 to impinge upon wastewater therein. This impingement results in a state of high wastewater-gas turbulence and the production of a froth column within mixing zone 24. As a consequence of providing a high degree of liquid turbulence, bubbles of oxygenating gas, having relatively large surface areas are thoroughly dispersed in the liquid. In addition, the high liquid phase turbulence is effective to promote a greater rate of mass transfer across the interfacial area created by the bubbles formed in zone 24.

Figure 6:
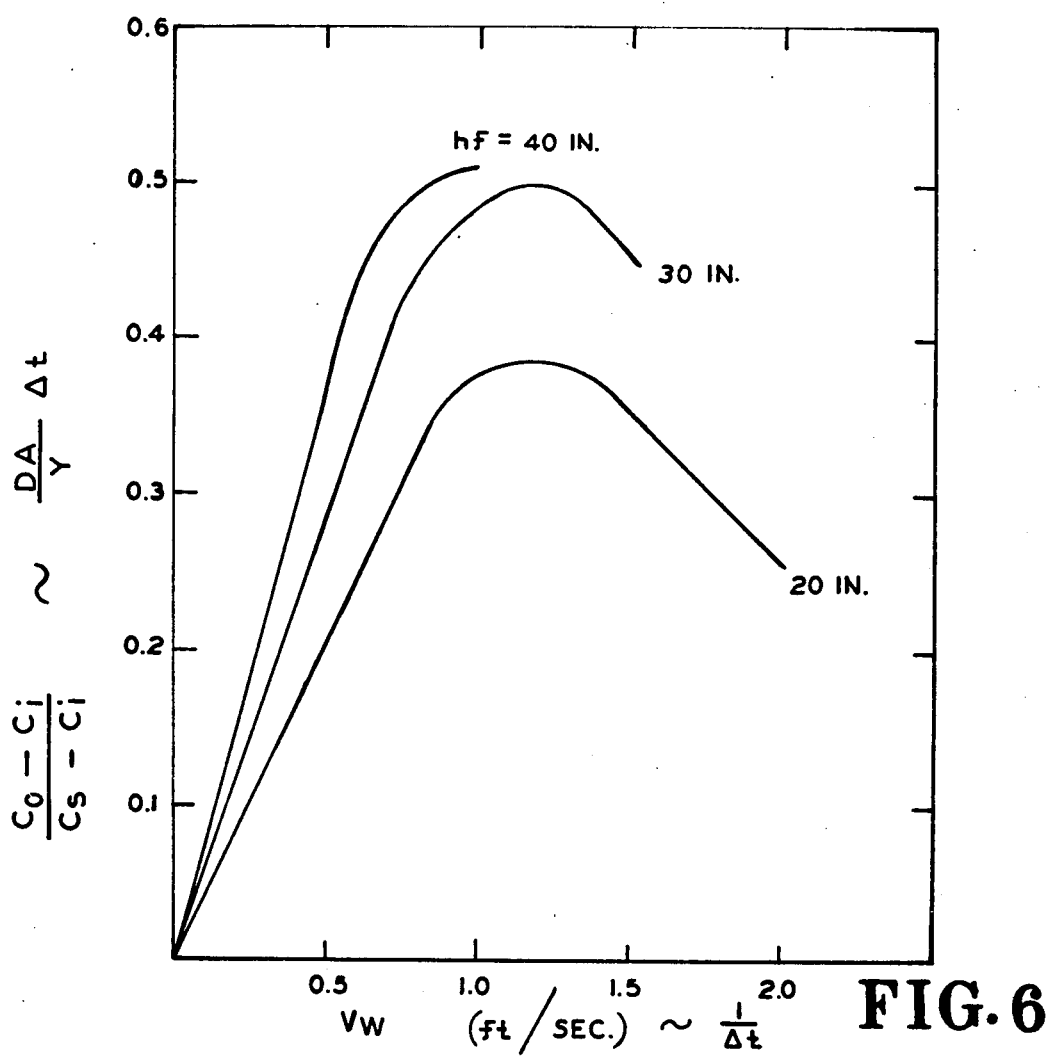
FIG. 6 is a graphical representation of oxygen consumption with respect to the superficial flow velocity of wastewater in an oxygenating apparatus according to the present invention.

Although the importance of creating a turbulent condition will be understood from the foregoing discussion, a further parameter, namely the "superficial" flow velocity of water through zone 24 is also an important factor in obtaining a maximum utilization of the oxygenating gas supplied to zone 24. The superficial flow velocity of wastewater may readily be calculated by dividing the flow rate by the cross-section area between partition 21 and baffle 23. It has been found that for a particular fall height which is defined, for example, by the distance between the top of a partition or weir and the depressed level of such water as tap water in a liquid accumulation space, the amount of oxygen dissolved in tap water will vary as a function of the superficial flow velocity of water through a static mixing zone. Thus, for a particular fall zone, the "deficit reduction ratio" of oxygen may be plotted against different superficial flow velocities of water. Such a graphical representation is depicted in FIG. 6, wherein the deficit reduction ratio, which may be defined by the expression $C_{out} - C_{in}/C_s - C_{in}$ is plotted along the ordinate. The terms $C_{out}$ and $C_{in}$ represent the concentrations of oxygen dissolved in tap water after and before, respectively, the water has undergone a gravitational fall in a static mixing zone. The term $C_s$ represents the saturated concentration of dissolved oxygen in water under experimental conditions. Thus, the foregoing expression, or the deficit reduction ratio, represents a measure of the efficiency of the gravitational fall zone in utilizing supplied oxygen. Accordingly, this ratio reflects the amount of oxygen actually dissolved in water in the fall zone against the experimental maximum amount which could be so dissolved.

The superficial flow velocity of water is plotted on the abcissa and this velocity may be easily varied by controlling the speed of operation of hydraulic pump 17 in a conventional manner.

Referring again to FIG. 6, it is noted that for a particular fall height a maximum deficit reduction ratio occurs at approximately the same superficial flow velocity of water therethrough. That is, a maximum deficit reduction ratio occurs at a superficial flow velocity of approximately 1.0 ft./sec. regardless of the fall height of a gravitational fall zone.

One possible explanation of the occurrence of an optimum superficial flow velocity and the relationships between superficial flow velocities and deficit reduction ratios illustrated in FIG. 6 is as follows. As the superficial flow velocity of water increases, additional turbulence in the fall zone can be expected to occur which promotes greater oxygenation, i.e. greater dissolution of oxygen in water as previously mentioned. However, as the superficial flow velocity increases the period of time during which oxygenation may take place in the fall zone is reduced and accordingly, the actual degree of oxygenation in the fall zone is correspondingly diminished. It has been found that superficial flow velocities in the range of 0.33 ft./sec. to 3.0 ft./sec. will result in maximum deficit reduction ratios for a particular fall height.

From the foregoing, it will be appreciated that by maintaining a highly turbulent condition of wastewater in a confined static mixing zone 24, and by providing an optimum superficial flow velocity of wastewater therethrough, a high concentration of dissolved oxygen in wastewater is achieved.

The flow of wastewater exiting from static mixing zone 24 carries therewith entrained bubbles of the oxygenating gas. Thus, as wastewater flows beneath the lowermost extremity of baffle 23 and upwardly toward the depressed wastewater level in liquid accumulation space 25, a circulating pattern of wastewater with gas bubbles entrained therein, is established generally in accordance with the arrows depicted in FIG. 1. In the course of such a flow, the turbulence is dissipated in the relatively quiescent liquid accumulation zone 25 which permits the disentrainment of gas bubbles. Larger gas bubbles are disentrained into gas accumulation space 26 relatively rapidly as the velocity of the flow from mixing zone 24 diminishes in liquid accumulation space 25. Smaller gas bubbles will also be disentrained from the wastewater although a greater tendency to drag such smaller bubbles downwardly within liquid accumulation space 25 exists. A further opportunity for dissolution of the oxygenating gas into the liquid in liquid accumulation space 25 is thus provided and although some very small gas bubbles are emitted from this space through flap 31 or nozzle 33 or both, such amounts are emitted near the bottom of tank 13 and are still available for dissolution in wastewater 12. Additionally, the amounts of oxygenating gas which may escape to the surface of wastewater 12 are well within both economical and safety limits even during the treatment of wastewater exhibiting high detergent concentrations.

It has been found in practice that most of the entrained oxygenating gas in wastewater exiting from static mixing zone 24 is disentrained into gas accumulation space 26. The disentrained oxygenating gas is thus returned or recycled to the static mixing zone 24 via passage 28.

The dissolution of oxygen in wastewater causes certain other gases such as nitrogen to be stripped from the wastewater and released into gas accumulation space 26. In order to prevent the excessive buildup of impurities such as nitrogen which would reduce the oxygen content of the oxygenating gas below acceptable levels, a venting conduit 30 is provided. The venting of the oxygenating gas containing such impurities may be either intermittent or continuous and may be controlled by suitable valve devices (not shown) in a conventional manner. It has been found that the amount of oxygen vented along with the waste gases is well within economical limits.

It will be understood that efficient dissolution of oxygen is facilitated by recycling the oxygenating gas not initially dissolved in zone 24. The flow of wastewater through the mixing zone is effective to sweep gas downwardly through zone 24 into liquid accumulation space 25. However, the normal buoyant forces acting on bubbles of the entrained oxygenating gas causes a disentrainment of the gas into gas accumulation space 26 and thereby forces the oxygenating gas upwardly toward passage 28. In this manner, the oxygenating gas is recycled to mixing zone 24 and is again available for dissolution in the incoming wastewater.

The oxygenated wastewater contained within liquid accumulation space 25, which will have a relatively high oxygen concentration, such as for example, 15 mg./l., is emitted from chamber 11 at an increased velocity through flap 31 or nozzle 33 or both into the main body of wastewater 12. The oxygenated wastewater in liquid accumulation space 25 is maintained under a pressure head such that oxygenated wastewater may be emitted from chamber 11 at an increased velocity sufficient to cause an adequate stirring of wastewater 12 in tank 13 and thereby maintain activated sludge particles in suspension. Furthermore, by adjusting the opening of flap 31 and/or the directionality and opening of nozzle 33, a predetermined flow pattern of highly oxygenated wastewater may be established in tank 13. Production of such a flow pattern will permit a relatively constant dilution of the highly oxygenated wastewater emitted from liquid accumulation space 25 thereby assuring that wastewater in substantially all parts of tank 13 will be oxygenated to a level, such as 0.5 p.p.m., which level is sufficient to sustain aerobic conditions therein. Furthermore, by adjusting the opening and directionality of each of nozzles 33 in chambers 11 and 11', the effluent from such nozzles may be arranged to cooperate in establishing a predetermined flow pattern of highly oxygenated wastewater within tank 13.

It is realized that the foregoing tank stirring operations may be effected by utilization of oxygenation apparatus 10 without the additional requirement of mechanical agitating devices. Also, in accordance with the present invention, the enriched oxygen atmosphere maintained within oxygenating apparatus 10 does not extend across the surface of wastewater 12 and as no moving parts are utilized within gas accumulation space 26, the possibility of a spark being produced therein is highly unlikely. Moreover, as the oxygenating apparatus 10 according to the present invention is at least partially submerged in wastewater 12 and contains only relatively small amounts of oxygenating gas, the possibility of fire damage is still further minimized. At certain portions and particularly lower depths in tank 13, relatively high dissolved oxygen levels are exhibited. This effect occurs primarily due to the discharge of highly oxygenated wastewater from the bottom of apparatus 10 which achieves a "bottom scouring" of tank 13 as will be described in greater detail hereafter. However, notwithstanding such high dissolved oxygen levels below the surface at wastewater 12, surface oxygen concentrations are clearly within prescribed safety limits.

The oxygenating apparatus 10 illustrated in FIGS. 1-3 has been experimentally tested. The wastewater to be treated experimentally comprised the industrial waste of a meat processing plant fed to a treatment tank 13 from a stirred retention basin. The particular treatment tank 13 utilized in the activated sludge waste treatment process is 25 feet square and 10 feet deep. Each of chambers 11 and 11' of apparatus 10 are approximately 4 feet square and exhibit a height of approximately 10 feet. Both flaps 31 and nozzles 33 were adjusted to establish predetermined flow patterns of oxygenated wastewater within the treatment tank.

The biological oxygen demand (BOD) of the industrial wastewater to be treated typically ranged from 800 to 2500 mg/l which demands are considerably greater than the average BOD of sewage to be treated in municipal facilities. Although the subject treatment tank was originally designed to process 40,000 gallons of 400 p.p.m. BOD wastewater per day using a conventional surface aerator, treatment rates of up to 100,000 g.p.d. of approximately 1100 p.p.m. BOD have been obtained utilizing only oxygenating apparatus 10 in such a treatment tank.

Figure 8:
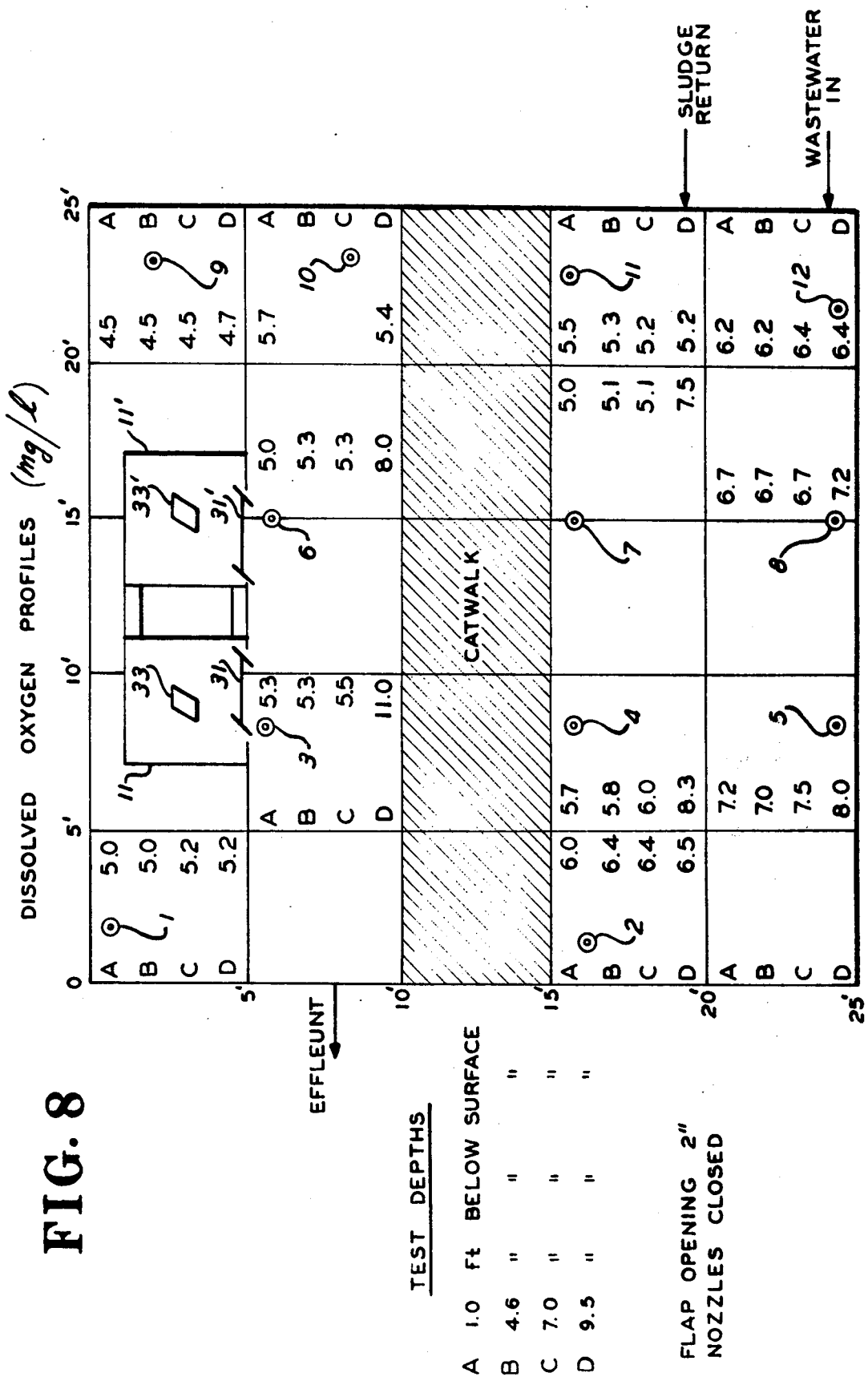
FIG. 8 is a profile of dissolved oxygen levels in wastewater treated with oxygenating apparatus in accordance with the present invention.

Referring now to FIG. 8, there is illustrated a profile of the levels of oxygen dissolved in the wastewater taken at twelve points throughout the treatment tank. In addition, at each such measurement point, DO levels were read at several test depths of 9.5, 7.0, 4.6 and 1.0 feet below the wastewater surface. A standard membrane dissolved oxygen probe was utilized to measure such concentrations which are depicted in FIG. 8 in units of milligrams per liter. In the tests conducted, each of flaps 31 and 31' were adjusted to a 2 inch opening while nozzles 33 and 33' were closed. Untreated wastewater was admitted to the treatment tank at a corner remote from apparatus 10 with the treated effluent being removed from a point on the side of the tank opposite to the wastewater inlet. A sludge return line was arranged to discharge sludge into the treatment tank at a point adjacent to the wastewater inlet.

From the DO level measurements obtained a generally even distribution of such levels throughout the treatment tank is observed. Thus, at each of points 1-12 and at various depths at each point, dissolved oxygen levels between 4.5 and 7.0 mg/l have been observed. Furthermore, such dissolved oxygen levels are more than adequate for maintaining aerobic conditions in the industrial wastewater to be treated. Certain higher DO levels have been measured during the operation of oxygenating apparatus 10. For example, at point 3, depth D, a DO level of 11.0 mg/l has been measured. At this measurement is taken in close proximity to flap 31 (which as aforesaid is provided at the bottom of chamber 11) a relatively high DO level is to be expected as the highly oxygenated wastewater from chamber 11 has not been thoroughly diluted in the wastewater within the treatment tank. In addition, it is noted that relatively high DO levels have been obtained at depth D for points 4 and 5 which points are aligned with flap 31 and are at approximately the same depth within the treatment tank. Similarly, relatively high DO levels are obtained at depth D for points 6, 7 and 8 which points are aligned with flap 31' of chamber 11'. Satisfactory DO levels have also been measured at points 1 and 9 which points are not directly exposed to the discharged oxygenated wastewater from apparatus 10. Accordingly, the measured DO levels at points 1 and 9 indicate that an adequate dilution and mixing of wastewater in the treatment tank has been effected and that sufficient oxygen is dissolved to maintain aerobic conditions in substantially all portions of the treatment tank.

Figure 9:
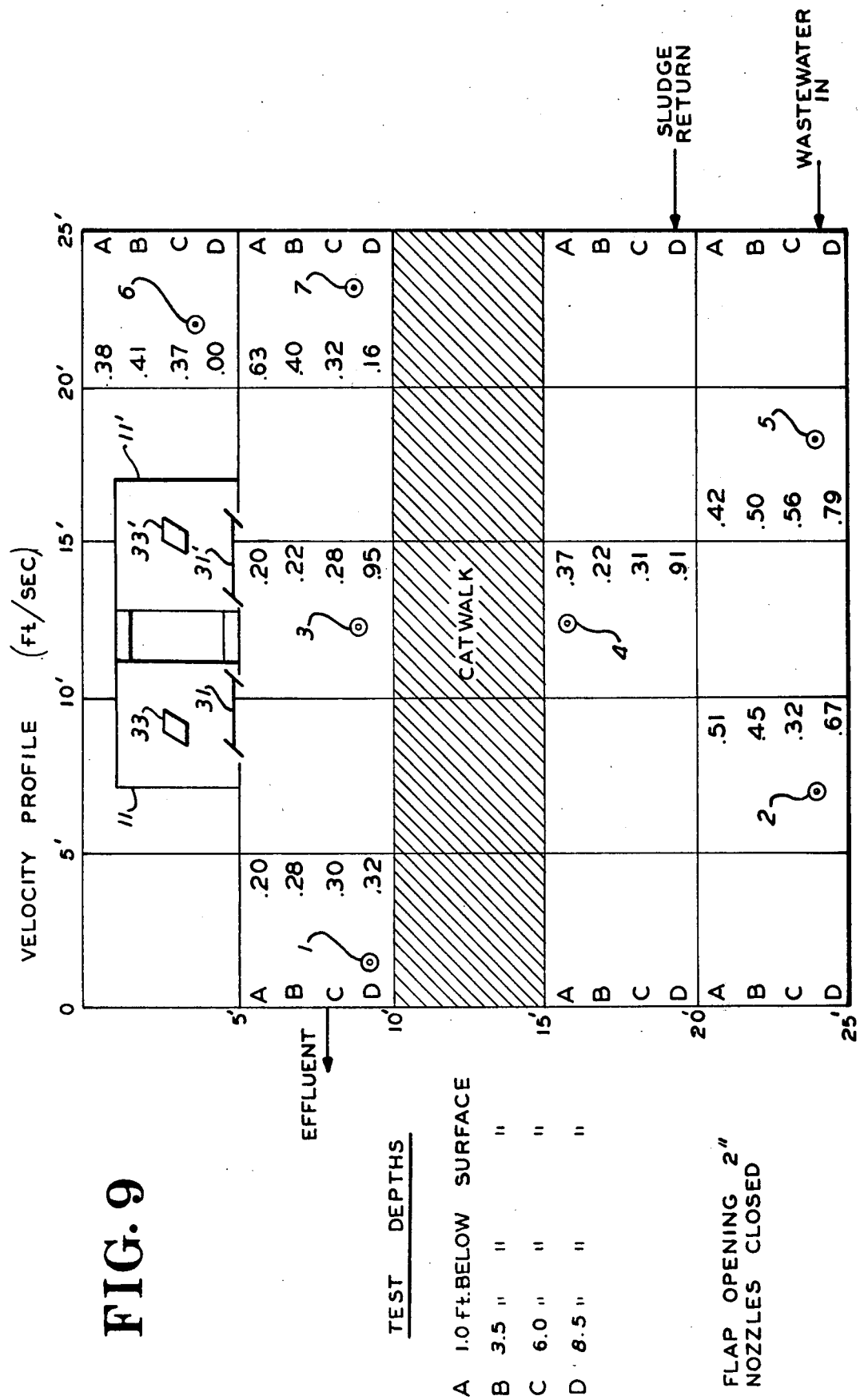
FIG. 9 is a velocity profile of wastewater in a treatment tank during operation of the oxygenating apparatus in accordance with the present invention.

Measurements of flow velocities at several points in the treatment tank have been made and a profile of such velocities is depicted in FIG. 9. At each of points 1–7, flow velocities were measured at several test depths although the accuracy of such measurements is not considered to be totally reliable because of the particular instrumentation utilized. Measurements of flow velocities at a depth of 8.5 feet below the wastewater surface at points 2-5 ranged from 0.67 to 0.95 ft./sec. The higher flow velocities at this depth are not unexpected as such readings were taken at points and at a depth aligned with the discharge of flaps 31 and 31' prior to substantial dilution of the highly oxygenated wastewater. However, lower readings of flow velocities at other depths and at other points within the treatment tank appear to result from the general mixing and dilution of the highly oxygenated wastewater within the treatment tank. Furthermore, the rate at which wastewater was admitted to the treatment tank was subject to fluctuations which were reflected in uneven flow velocities at various measurement points.

Several flow velocities measured at various depths at points 1-7, are near the lower end of the range of flow velocities generally considered as acceptable for adequate mixing of the suspended solids in the secondary stage of an activated sludge process. However, for the velocity profile illustrated in FIG. 9, nozzles 33 and 33' were closed. Thus, further adjustment of flaps 31 and 31' and the opening of nozzles 33 and 33' may be effected to obtain other flow patterns and velocities within the treatment tank. Although flow velocities in certain portions of tank 13 are less than the velocities traditionally considered necessary for maintaining solids in suspension (e.g. 0.5-1.0 ft./sec. at the wastewater surface), apparatus 10 is particularly effective to generate satisfactory flow velocities at lower depths in tank 13. The importance of this effect resides in the fact that most solids tend to accumulate toward the bottom of tank 13 and as lower portions of the tank are subjected to the greatest flow velocities, activated sludge particles are consistently stirred and thereby maintained in suspension. Thus, the foregoing "bottom scouring" of tank 13 effectively provides the requisite stirring of wastewater 12 without reliance upon mechanical devices. Accordingly, the greatest flow velocities of oxygenated wastewater discharged from apparatus 10 are provided at depths at which stirring is most important.

Preliminary measurements of mixed liquor suspended solids have indicated uniform concentrations of approximately 3200 mg/l. with volatile solids comprising 75-80% of the total suspended solids. The foregoing suspended solids concentrations have been recorded at depths of 1.5, 5.0 and 8.0 feet below the wastewater surface in tank 13. Accordingly, the stirring of wastewater 12 by apparatus 10 is sufficient to maintain suspended solids concentrations necessary for continuance of the activated sludge process.

In addition to measuring dissolved oxygen levels and flow velocities at various points within treatment tank 13, several operating parameters of oxygenating apparatus 10 have been recorded. As indicated in Table I, the rates at which oxygen is supplied to and vented from apparatus 10 have been measured for varying fall heights. Particular fall heights were measured by means of a calibrated differential pressure gauge and oxygen flow rates were measured by conventional flow meters. The dissolved oxygen levels of wastewater at the inlet and outlet of oxygenating apparatus 10 were measured by a standard membrane dissolved oxygen probe with the change in DO levels indicated below.

TABLE I

| Fall Height (in.) | Change in Dissolved $O_2$ Level (p.p.m.) | Oxygen Supply (lb/hr.) | Oxygen Vent (lb/hr.) | Percent $O_2$ in Gas Space |
|---|---|---|---|---|
| 21 | 9.0 | 15.9 | 2.1 | 63 |
| 37 | 12.0 | 15.9 | 2.0 | 67 |
| 42 | 14.0 | 22.8 | 6.0 | 71 |
| 52 | 15.5 | 23.2 | 7.4 | 69 |
| 63 | 16.5 | 24.8 | 9.2 | 72 |

Pump 17 was operated to supply wastewater to plenum 18 at a flow rate which was measured by a weir measurement technique at approximately 2,000 g.p.m.

Samples of wastewater 12 taken during testing of oxygenating apparatus 10 indicated an average wastewater temperature of 29° C. The input wastewater contained an average BOD of 1100 mg/l with 99% BOD removal measurements being consistently obtained.

As the data set forth above have been observed during the experimental testing of oxygenating apparatus 10, it will be understood that such data are merely exemplary of this operation. Accordingly, operating conditions have not been optimized although it is clearly desirable to increase the ratio of dissolved oxygen per horsepower hour and to reduce the percentage of oxygen vented from apparatus 10 as far as possible. For example, in order to preclude the possibility of a 'short circuiting' of the feed gas supplied through inlet 29 to vent 30, it may be desirable to rearrange the location of the feed and vent conduits. Furthermore, although a commercially pure oxygen supply has been utilized in the course of testing apparatus 10, less than commercially pure oxygen may be utilized. Preferably, the oxygen supply will exhibit an oxygen concentration of at least 40%.

Referring now to FIG. 4 of the drawing, illustrated therein is a further exemplary embodiment of oxygenating apparatus 40 suitable for emplacement within a body of wastewater 12. Oxygenating apparatus 40 is comprised of a generally enclosed submerged chamber 43 having an inlet 45 in the form of a suitable pipe or conduit sealed to the top of chamber 43 by suitable sealing means 44. A hydraulic pump 46 which may comprise a rotatable impeller pump mounted for rotation on shaft 47 is disposed within inlet conduit 45. The outlet of conduit 45 communicates with a liquid space defined by a portion of the exterior 43, a portion of baffle 50 and a portion of a substantially vertically disposed partition 49 which, at the lower extremity thereof, is rigidly affixed to baffle 50. A static mixing zone 51 is defined within chamber 43 by a further portion of baffle 50 and a baffle 52, which is spaced away from and oriented substantially parallel with baffle 49. The lower portion of static mixing zone 51 communicates with liquid accumulation space 53 with the remaining portion of chamber 43 being substantially comprised of gas accumulation space 54 formed in the upper reaches thereof. An inlet 56 is provided to permit the introduction of a feed gas under pressure into the upper reaches of chamber 43 and a passage 55 is defined by the upper extremity of baffle 52 and the top wall of chamber 43 thereby providing communication between gas accumulation space 54 and the upper reaches of the static mixing zone 51. A suitable venting means, schematically illustrated as conduit 57, is provided to permit the venting of waste gases from gas accumulation space 54.

An outlet from chamber 43 is provided in a lower portion thereof and may take the form of a nozzle 58, the opening and directionality of which may be controlled by an operator located exterior to apparatus 40 and above wastewater 12. An exemplary control arrangement for nozzle 58 may comprise a torque tube 59 extending from an accessible point above wastewater 12 through the top wall of chamber 43 to nozzle 58. A control rod 60 is loosely fitted within torque tube 59 and, by raising the lowering control rod 60, the extent of opening of nozzle 58 may be controlled. Similarly, rotation of torque tube 59 which is nested within conduit 61 is effective to control the directionality of flow through nozzle 58. Conduit 61 is utilized to form a pressure relief and bubble baffle in a manner similar to like structure illustrated in FIG. 2. A detailed description of a nozzle suitable for use with oxygenating apparatus 40 will be described hereafter in connection with FIG. 5.

Oxygenating apparatus 40 is similar to apparatus 10 in that both are designed for ready insertion into a wastewater treatment tank 13. However, it is realized that upon insertion of apparatus 40 (which preferably represents one half of a twin unit) in such a tank, buoyant forces acting on chamber 43 will tend to prevent the proper orientation of the apparatus in tank 13. Unbalanced buoyant forces act on chamber 43 as a result of gas accumulation in space 54 not being symmetrically formed therein. Accordingly, oxygenating apparatus 40 is especially suited to treatment tank 13 wherein chamber 43 may be rigidly affixed to either a side wall or mounted on legs (not shown) and affixed to a bottom wall of such a treatment tank. In FIG. 4, bracket means 62 are illustrated as suitable connecting elements for affixing chamber 43 to a side wall of treatment tank 13. However, it will be understood that other means for retaining chamber 43 in order to provide a proper orientation thereof may be utilized. In addition, supporting legs (not shown) may be utilized to maintain chamber 43, spaced away from the bottom of treatment tank 13.

The operation of oxygenating apparatus 40 is substantially identical to the operation of apparatus 10 illustrated in FIG. 1. In oxygenating apparatus 40, wastewater is pumped under pressure by pump 43 through conduit 45. Wastewater exiting from conduit 45 is then caused to flow upwardly through channel 48 formed between conduit 45 and baffle 49, as well as through channel 48' which is defined by a side wall of chamber 43 and conduit 45. It will be understood that a water seal is provided between gas accumulation space 54 and pump 46 in a manner similar to the water seal provided in the oxygenating apparatus 10 illustrated in FIG. 1. Wastewater is then subjected to a gravitational fall upon passing over the uppermost edge of baffle 49.

An oxygen-containing feed gas is introduced through conduit 56 into the upper reaches of chamber 43 under a pressure which is effective to depress the level of water therein to a predetermined level. A gas accumulation space 54 is thereby formed in chamber 43 with the extent of this space being determined by the pressure of the supplied feed gas.

The wastewater undergoing a gravitational fall within the upper reaches of static mixing zone 51 impinges upon the wastewater therein which results in a highly turbulent condition and promotes an effective dissolution of oxygen supplied to zone 51 in the turbulent wastewater in a manner substantially identical to the oxygenation of wastewater in static mixing zone 24 of the apparatus illustrated in FIG. 1. It will be appreciated that the flow rate of wastewater into static mixing zone 51 is adjusted to an optimum superficial velocity, which for example may be approximately 1 ft./sec.

Oxygenated wastewater is emitted from static mixing zone 51 into a liquid accumulation space 53 through an opening provided between the lowermost edge of baffle 52 and baffle 50. The general flow pattern of wastewater within space 53 is a circulating one wherein wastewater initially flows upwardly toward gas accumulation space 54 and subsequently flows downwardly toward the lower reaches of chamber 43. As the oxygenated wastewater flows toward gas accumulation space 54, large entrained bubbles of the oxygenating gas are rapidly disentrained into gas accumulation space 54 and may be recycled through passage 55 to static mixing zone 51. Upon entering the liquid accumulation space 53, the velocity of oxygenated wastewater decreases to a relatively low value which in turn promotes the disentrainment of gas bubbles therefrom. In addition, a further dissolution of the oxygenating gas into the wastewater in liquid accumulation space 53 is also effected. Although some smaller gas bubbles are not disentrained from the oxygenated wastewater and are dragged downwardly toward the lower reaches of chamber 43, it has been found that only a small fraction of oxygenating gas is emitted through nozzle 58 into wastewater 12.

During the process of oxygenating wastewater in static mixing zone 51, certain impurities in the wastewater such as for example nitrogen gases are stripped therefrom and are disentrained into gas accumulation space 54. A venting conduit 57 is provided in communication with gas space 54 and through either a continuous or intermittent venting operation by conventional valving means (not shown), such impurities are removed from chamber 43. Although such venting also entails removal of oxygen, it has been found that only a minor portion of such gas is vented.

Oxygenated wastewater contained in liquid accumulation space 53 is discharged from chamber 43 through nozzle 58 in a manner substantially identical to the discharge of oxygenated wastewater from chamber 11 as previously described in connection with the apparatus illustrated in FIG. 1. Thus, torque tube 59 and control rod 60 are operated to control the directionality and opening of nozzle 58, respectively, to thereby establish a predetermined flow of oxygenated wastewater within the main body of wastewater 12. In this manner, wastewater 12 is stirred and the dissolved oxygen content thereof is increased such that in an activated sludge process, sludge will be maintained in suspension in wastewater 12 and aerobic conditions will be sustained as well.

Figure 5:
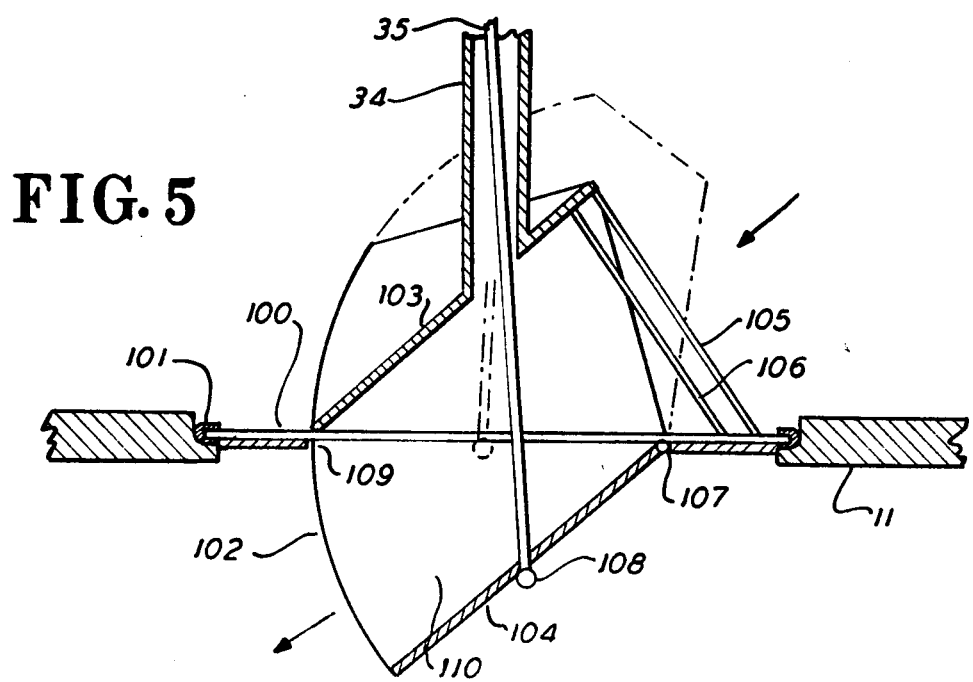
FIG. 5 is a sectional view of an exemplary embodiment of an outlet nozzle.

Referring now to FIG. 5, there is illustrated an exemplary embodiment of a discharge nozzle suitable for use in connection with oxygenating apparatus illustrated in FIGS. 2 and 4. Nozzle 33 is comprised of a plate 100, a spout 102 and control means in the form of torque tube 34 and control rod 35 for controlling the opening and directionality of spout 102. Plate 100 extends across a substantially circular aperture in the bottom wall of chamber 11 (FIG. 1) and, if desired, may be rotatably sealed thereto by means of a suitable circumferential seal means 101. Spout 102 is comprised of an upper inclined portion 103 which is rigidly affixed to torque tube 34 with the lower end of portion 103 being firmly attached to plate 100 at point 109. The upper end of portion 103 is rigidly affixed to bracing rods 105 and 106 which in turn are likewise affixed at the lower ends thereof to plate 100. An aperture is defined in plate 100, which aperture is preferably rectangular. A lower portion 104 of spout 102 is pivotable along a line extending through point 107. A substantially vertical rear wall 110 of spout 102 is formed between portions 103 and 104. Control rod 35 is loosely positioned within torque tube 34 and extends downwardly through lower portion 104 of spout 102. Rod 35 is operatively connected to portion 104 by way of a protrusion or a clevis nut 108 formed at the lower extremity of rod 35.

The operation of nozzle 33 will now be described. As previously mentioned, torque tube 34 and control rod 35 extend upwardly from chamber 11 above wastewater 12, preferably to a point at which external operation of such members may be effected. The extent of the opening of nozzle 102 is controlled by the raising or lowering of rod 35 which in turn is effective to pivot the lower portion 104 of spout 103 about a line through point 107. Thus, upon raising control rod 35, portion 104 of spout 102 is translated to a position indicated by the dashed line illustrated in FIG. 5. During this operation, however, upper portion 103 of spout 102 remains substantially stationary. Accordingly, in the foregoing manner, the extent of the opening of nozzle 33 may be simply controlled. In order to control the directionality of the flow of wastewater emitted through nozzle 33, torque tube 34 is rotated in a substantially horizontal plane. As upper portion 103 of the spout is rigidly affixed to plate 100 and to torque tube 34 plate 100 is rotated about its axis with the extent of such rotation being determinative of the azimuthal direction of wastewater discharged through nozzle 33. It will be appreciated that as plate 100 is seated on a shoulder formed in the bottom wall of chamber 11, the pressure of wastewater thereabove is effective to assist in sealing plate 100 to such a bottom wall, yet nonetheless permit rotation of plate 100 in response to a similar rotation of torque tube 34. In the foregoing manner, therefore, a relatively simple directionality control of nozzle 33 is effected.

Figure 7:
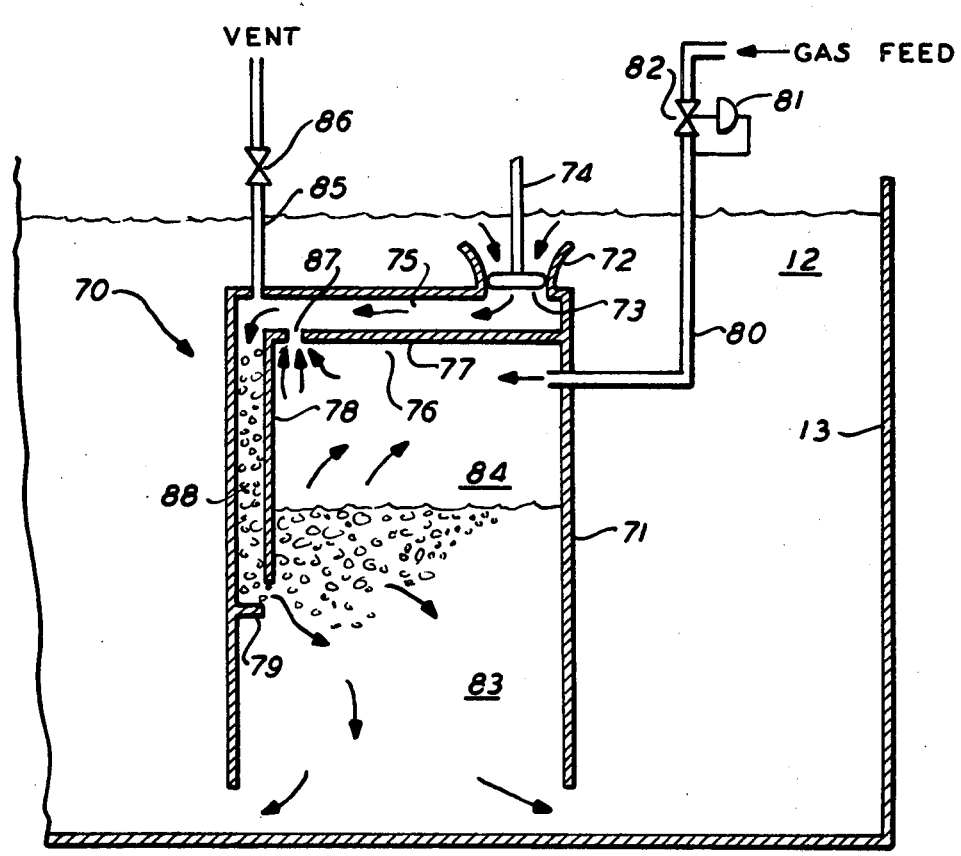
FIG. 7 is a sectional elevational view of yet another exemplary embodiment of oxygenating apparatus in accordance with the present invention.

In accordance with another exemplary embodiment of an apparatus for oxygenating wastewater, there is illustrated in FIG. 7 an apparatus 70 generally suitable for emplacement within a waste treatment tank containing a body of wastewater 12. A generally enclosed chamber 71 having an open bottom is provided with an inlet 72 for admitting wastewater into the upper reaches thereof. A hydraulic pump 73, which may comprise a conventional axial flow impeller pump mounted for rotation on a shaft 74. An electrical motor (not shown) is positioned at a suitable location above wastewater 12 for rotating shaft 74 thereby driving pump 73 and forcing wastewater into chamber 71. A partition 76 is disposed interiorally of chamber 71 and preferably comprises a substantially horizontal portion 77 extending from one sidewall of chamber 71 and a substantially vertical portion 78 depending from the opposite end of horizontal portion 77. A small passage 87 is defined in the horizontal portion 77 preferably at a point remote from inlet 72; or such a passage may be formed in vertical portion 78 of partition 76 immediately below horizontal portion 77. A substantially horizontal channel 75 is thus formed and extends from inlet 72 across the upper reaches of chamber 71 to a point approximately above the upper portions of partition 78. The latter partition and a sidewall of chamber 71 are so disposed so as to form a static mixing zone 88 of the gravitational fall type within chamber 71. A baffle 79 is provided at the lower portion of static mixing zone 78 and is spaced away from the lower extremity of partition 78 to permit liquid flow from static mixing zone 88 into a liquid accumulation space 83. A conduit 80 is provided to communicate between chamber 71 and through valve 82 to a source of feed gas. As will be described hereafter, a gas accumulation space 84 is formed immediately beneath horizontal portion 77 of partition 76 and the oxygenating gas within space 84 is permitted to communicate with the upper reaches of the static mixing device and channel 75 through passage 87 in portion 77. A conduit 85 is also provided to communicate with the upper reaches of the static mixing zone 88 for the purpose of venting gas therefrom through a suitable valve means 86. In addition, a pressure regulating device 81 may be used in connection with valve 82 in order to maintain the oxygenating gas under a predetermined pressure and hence maintain the liquid level within liquid accumulation space 83 at a substantially constant height.

The operation of the wastewater oxygenating apparatus 70 illustrated in FIG. 7 will now be described. Prior to operation of apparatus 70, chamber 71 is substantially filled with wastewater. Pump 73 is energized and thereby forces wastewater into channel 75 under pressure. Upon the subsequent introduction of a feed gas under pressure through conduit 80 into chamber 71, the level of wastewater within chamber 71 is depressed to an extent corresponding to the magnitude of the pressure of the supplied feed gas. Accordingly, a gas accumulation space 84 is formed within chamber 71. The wastewater admitted into channel 75 then undergoes a gravitational fall at the upper portion of static mixing zone 88. However, as the oxygenating gas is maintained in communication with channel 75 through an aperture 87 formed in portion 77 of partition 76, a further gas space is maintained in the upper reaches of the static mixing zone 88. As the wastewater undergoes the aforementioned gravitational fall, a highly turbulent condition is caused in the static mixing zone 88 which in turn results in a high level of oxygen dissolution in the wastewater in a manner substantially identical to that as previously described in connection with oxygenating apparatus 10 illustrated in FIG. 1. The oxygenated wastewater is subsequently emitted from static mixing zone 88 and enters the liquid accumulation space 83 while entrained bubbles of the oxygenating gas are disentrained from the wastewater in space 83 and returned to gas accumulation space 84. The oxygenating gas so returned to space 84 is thus available for recycling and is subsequently returned to the static mixing zone 88 through aperture 87 as previously described. The oxygenated wastewater introduced into liquid accumulation space 83 is permitted to flow from the lower reaches of chamber 71 into the main body of wastewater 12 for admixture therein. In the foregoing manner, the highly oxygenated wastewater emitted from liquid accumulation space 83 of the chamber 81 is diluted in the body of wastewater 12. Accordingly, the dissolved oxygen level of wastewater 12 is increased to a level such as 0.5 p.p.m. which is suitable for sustaining aerobic conditions within wastewater 12.

The methods and apparatus according to the present invention have been described hereinbefore in connection with the oxygenation of wastewater and particularly in an activated sludge waste treatment process. It will be appreciated by those skilled in the art that the present invention is not limited to the dissolution of oxygen in wastewater but may be utilized generally to dissolve a gas in a liquid such as, for example, ozone in water, or to dissolve carbon dioxide in an aqueous solution to adjust the pH level thereof. Alternatively, the present invention may be utilized to oxygenate industrial waste materials such as "black liquor" in paper production processes.

It will also be understood that the apparatus embodying the present invention is highly modular in and readily insertable in a body of wastewater to be oxygenated. Thus, a plurality of oxygenating apparatus such as apparatus 10 or 40 could be positioned in such wastewater with the discharge of each apparatus cooperating to provide a predetermined flow pattern in, for example, a treatment tank.

While the foregoing oxygenating apparatus has been described as positioned within a treatment tank, it will be realized that this apparatus may be arranged to float in or be positioned adjacent to a treatment tank. In the latter instance, suitable piping and conduits may be provided to introduce untreated wastewater into the oxygenating apparatus and to return oxygenated wastewater to the treatment tank. Additionally, it will be realized that the present oxygenating apparatus may be formed in geometries other than rectangular.

While the present invention has been particularly described in terms of specific embodiments thereof, it will be understood that numerous variations upon the invention are now enabled to those skilled in the art, which variations are yet within the scope of the instant teaching. Accordingly, the present invention is to be broadly construed and limited only by the scope and the spirit of the claims now appended hereto.

We claim:

1. A method of oxygenating a body of wastewater containing organic solids and comprising the steps of:
providing a generally enclosed chamber having an inlet, an outlet, and a static mixing zone intermediate said inlet and outlet;
admitting at least a portion of said body of wastewater into said chamber through said inlet;
passing said admitted wastewater to said static mixing zone;
introducing an oxygenating gas into said static mixing zone and oxygenating said admitted wastewater by dissolving at least a portion of the oxygen in said gas in said admitted wastewater;
collecting undissolved oxygen entrained in said wastewater subsequent to the passage of wastewater through said static mixing zone;
recirculating said collected oxygen to said static mixing zone for further dissolution in wastewater therein, and
emitting said oxygenated wastewater from said chamber through an adjustable nozzle at the outlet of said chamber and controlling the opening and directionality of said nozzle to mix said oxygenated wastewater with said body of wastewater such that said organic solids in said body of wastewater are maintained in suspension.

2. A method of oxygenating a body of wastewater as defined in claim 1 wherein said step of passing said admitted wastewater to said static mixing zone comprises subjecting said admitted wastewater to a gravitational fall in said static mixing zone.

3. A method of oxygenating a body of water comprising the steps of:
providing a generally enclosed chamber having an inlet and outlet in said body of water;
admitting at least a portion of said water into said chamber;
forming an oxygen enriched gas space by introducing an oxygenating gas into said chamber;
subjecting said admitted water within said chamber to a gravitational fall over a weir and through said oxygenating gas in a gravitational fall zone in said gas space such that the liquid-gas turbulence produced by said gravitational fall of said water effects a mass transfer of at least a portion of the oxygen in said introduced oxygenating gas into said water to thereby oxygenate said admitted water; and
discharging said oxygenated water from said chamber through an adjustable nozzle at said outlet at a predetermined velocity and direction to effect a dilution of said oxygenated water in said body of waters; and
adjusting the opening and directionality of said nozzle such that a predeterined flow pattern of oxygenated water is established in said body of water.

4. An activated sludge wastewater treatment process including the steps of admitting wastewater and recycled activated sludge into an uncovered secondary treatment tank to form a mixed liquor therein; oxygenating said mixed liquor; conducting said oxygenated mixed liquor to a clarification means; separating activated sludge and clarified effluent in said clarification means; and recycling a portion of said separated activated sludge to said treatment tank, the improvement comprising said oxygenation of mixed liquor including the steps of:
providing a generally enclosed chamber having an inlet and an outlet in said treatment tank;
admitting at least a portion of said mixed liquor in said treatment tank into said chamber;
forming an enriched oxygen gas spaced in said chamber by introducing an oxygenating gas into said chamber;

subjecting said admitted mixed liquor within said chamber to a gravitational fall over a weir through said oxygenating gas in a fall zone in communication with said gas space such that the liquid-gas turbulence produced by said gravitational fall of said admitted mixed liquor effects a mass transfer of at least a portion of said introduced oxygenating gas into said mixed liquor to thereby oxygenate said admitted mixed liquor;

discharging said oxygenated mixed liquor from said chamber through an adjustable nozzle at said outlet at a predetermined velocity and direction to effect a dilution of said oxygenated mixed liquor in said mixed liquor in said treatment tank; and adjusting the opening and directionality of said nozzle to establish a flow pattern of said oxygenated mixed liquor in said treatment tank to stir the contents of said tank such that said activated sludge is maintained in suspension.

5. A method of dissolving oxygen in a body of water having a dissolved oxygen demand which comprises:
(a) withdrawing water from said body and pumping it through a treatment chamber;
(b) introducing an oxygenating gas into said treatment chamber at a super-atmospheric pressure to form a body of gas therein;
(c) creating a turbulent condition in said pumped water by subjecting said pumped water to a gravitational fall over a weir into a gravitational fall zone within said chamber and in direct contact with said body of oxygenating gas whereby oxygen is dissolved and undissolved oxygenating gas is entrained in said turbulent water;
(d) passing said turbulent water to a quiescent zone within said chamber to dissipate said turbulence and cause disentrainment and recovery within said chamber of undissolved oxygenating gas; and
(e) discharging said water containing dissolved oxygen from said quiescent zone of said chamber through a nozzle into said body of water at a sufficient velocity to stir said body and substantially uniformly distribute the discharged water throughout the body of water from which it was withdrawn.

6. A method as defined in claim 5 additionally comprising the step of recirculating said disentrained oxygenating gas back to said gravitational fall zone for further dissolution in said pumped water.

7. Apparatus for oxygenating a body of wastewater comprising a chamber emplaceable in said body of wastewater; means for admitting at least a portion of said body of wastewater into said chamber; means for forming an oxygen enriched gas space in said chamber by introducing an oxygenating gas therein; means for subjecting said admitted wastewater within said chamber to a gravitational fall over a weir disposed in said chamber and through said oxygenating gas in a fall zone in said gas space such that the liquid-gas turbulence produced by said gravitational fall of said wastewater effects a mass transfer of at least a portion of the oxygen in said introduced gas into said wastewater thereby oxygenating said wastewater; and means for discharging said oxygenated wastewater from said chamber at a predetermined velocity and direction to effect a dilution of said oxygenated wastewater in said body of wastewater, said discharge means comprising a nozzle having a spout portion, the opening and directionality of which are adjustable.

8. Apparatus for oxygenating a body of wastewater comprising a chamber emplaceable in said body of wastewater; means for admitting at least a portion of said body of wastewater into said chamber; means for forming an oxygen enriched gas space in said chamber by introducing an oxygenating gas therein; means for subjecting said admitted wastewater within said chamber to a gravitational fall over a weir disposed in said chamber and through said oxygenating gas in a fall zone in said gas space such that the liquid-gas turbulence produced by said gravitational fall of said wastewater effects a mass transfer of at least a portion of the oxygen in said introduced gas into said wastewater thereby oxygenating said wastewater; and means for discharging said oxygenated wastewater from said chamber at a predetermined velocity and direction to effect a dilution of said oxygenated wastewater in said body of wastewater, said discharge means comprising a nozzle having a movable flap member.

9. Apparatus for oxygenating a body of wastewater containing organic solids comprising an oxygenating chamber emplaceable in said body of wastewater; means for pumping wastewater into said chamber; means for introducing an oxygenating gas into said chamber; means for creating a turbulent condition in said pumped wastewater in a mixing zone in said chamber and for contacting said turbulent wastewater with said oxygenating gas to thereby oxygenate said turbulent wastewater; liquid accumulation means within said chamber adapted to receive oxygenated wastewater from said mixing zone for substantially dissipating said turbulence and for reducing the velocity of said wastewater; and nozzle means comprising a spout portion, with the opening and directionality of said spout portion which are adjustable for discharging said oxygenated wastewater from said liquid accumulation means into said body of wastewater at a velocity increased with respect to the velocity of said oxygenated wastewater in said liquid accumulation means such that said body of wastewater is sufficiently stirred to maintain said organic solids suspended therein.

10. Apparatus for oxygenating a body of wastewater containing organic solids comprising an oxygenating chamber emplaceable in said body of wastewater; means for pumping wastewater into said chamber; means for introducing an oxygenating gas into said chamber; means for creating a turbulent condition in said pumped wastewater in a mixing zone in said chamber and for contacting said turbulent wastewater with said oxygenating gas to thereby oxygenate said turbulent wastewater; liquid accumulation means within said chamber adapted to receive oxygenated wastewater from said mixing zone for substantially dissipating said turbulence and for reducing the velocity of said wastewater; and nozzle means including a movable flap member for discharging said oxygenated wastewater from said liquid accumulation means into said body of wastewater at a velocity increased with respect to the velocity of said oxygenated wastewater in said liquid accumulation means such that said body of wastewater is sufficiently stirred to maintain said organic solids suspended therein.

11. Apparatus for oxygenating a body of wastewater containing organic solids comprising a generally enclosed oxygenating chamber emplaceable in said body of wastewater; means for pumping wastewater under treatment into said chamber; means for introducing an oxygenating gas into said chamber to form a gas space therein containing said oxygenating gas; means for rendering said pumped wastewater turbulent by subjecting said pumped wastewater to a gravitational fall over a weir through said oxygenating gas and into a gravitational fall zone substantially defined by said weir and by baffle means spaced therefrom with the resulting liquid-gas turbulence in said fall zone being effective to oxygenate said turbulent wastewater and entrain undissolved oxygenating gas therein; liquid accumulation means for receiving oxygenated wastewater from said fall zone and for dissipating said turbulence to enable disentrainment and recovery within said chamber of said undissolved entrained oxygenating gas; and nozzle means for discharging said oxygenated wastewater from said liquid accumulation means into said body of wastewater at a velocity such that said body of wastewater is sufficiently stirred to maintain said organic solids suspended therein.

12. Apparatus as defined in claim 11 wherein said baffle means extend below the surface of oxygenated wastewater in said liquid accumulation means such that said oxygenated wastewater and said undissolved entrained oxygenating gas flow from said gravitational fall zone under said baffle means into said liquid accumulation means.

13. Apparatus in accordance with claim 12 wherein said baffle means comprise a baffle disposed generally vertically; a portion of said weir extending therefrom to define the bottom of said fall zone with the bottom of said baffle being spaced from said portion to permit wastewater dropping through said fall zone and entraining said oxygenating gas therein, to pass under said baffle into said liquid accumulation means.

14. Apparatus as defined in claim 12 wherein said chamber includes means for returning at least a portion of said disentrained oxygenating gas to said gravitational fall zone.

15. Apparatus as defined in claim 11 wherein said chamber is emplaced in said body of wastewater under treatment.

16. Apparatus as defined in claim 11 additionally comprising a re-entrant well disposed between said pumping means and said means for rendering said pumped wastewater turbulent whereby an escape of said introduced oxygenating gas through said pumping means is substantially inhibited.

* * * * *